(12) United States Patent
Poghosyan

(10) Patent No.: US 11,882,169 B1
(45) Date of Patent: Jan. 23, 2024

(54) ADAPTIVE MEDIA STREAMING

(71) Applicant: PICSART, INC., San Francisco, CA (US)

(72) Inventor: Aghasi Poghosyan, Yerevan (AM)

(73) Assignee: PICSART, INC., Hallandale Beach, FL (US)

( * ) Notice: Subject to any disclaimer, the term of this patent is extended or adjusted under 35 U.S.C. 154(b) by 0 days.

(21) Appl. No.: 17/339,693

(22) Filed: Jun. 4, 2021

(51) Int. Cl.
 *H04L 65/70* (2022.01)
 *H04L 65/80* (2022.01)
 *H04L 65/75* (2022.01)

(52) U.S. Cl.
 CPC .............. *H04L 65/70* (2022.05); *H04L 65/75* (2022.05); *H04L 65/80* (2013.01)

(58) Field of Classification Search
 CPC ........ H04L 65/601; H04L 65/80; H04L 65/75
 See application file for complete search history.

(56) References Cited

U.S. PATENT DOCUMENTS

| | | | | |
|---|---|---|---|---|
| 11,146,839 | B1* | 10/2021 | Stroffolino | H04L 65/80 |
| 2005/0138192 | A1* | 6/2005 | Encarnacion | H04L 67/02 |
| | | | | 709/230 |
| 2013/0138649 | A1* | 5/2013 | Broberg | H04L 67/1021 |
| | | | | 707/736 |
| 2015/0120819 | A1* | 4/2015 | Zhang | H04L 65/601 |
| | | | | 709/203 |
| 2016/0173551 | A1* | 6/2016 | Mueller | H04L 65/601 |
| | | | | 709/219 |
| 2017/0019446 | A1* | 1/2017 | Son | H04W 4/021 |
| 2020/0037029 | A1* | 1/2020 | He | H04N 21/816 |
| 2021/0297709 | A1* | 9/2021 | Reitmeyer | H04N 21/63775 |
| 2022/0256213 | A1* | 8/2022 | Panagos | H04N 21/23439 |
| 2022/0272397 | A1* | 8/2022 | Sturm | H04N 21/2402 |

* cited by examiner

*Primary Examiner* — Kristie D Shingles
(74) *Attorney, Agent, or Firm* — Arluys IP, P.C

(57) ABSTRACT

Techniques are described for adapting the format of streaming media based on received interactions with the media. In an embodiment, a client computer system receives from media streaming service an initial version of media in an initial media format. After the media is presented, a request to interact with the initial version of the media may be received. Such a request may cause the client system to generate a change request data for the initial version of media. Based at least in part on the change request data for the initial version of the media, the new format for streaming the media to the client computer system is determined. The client computer system receives the media streamed in the new format.

25 Claims, 8 Drawing Sheets

ADAPTIVE MEDIA STREAMING

FIELD OF THE TECHNOLOGY

The present invention relates to the field of electronic image data analysis, in particular to adaptive media streaming.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The exponential growth of digital media consumption spawned an increase in demand for media editing. Many professional tools currently exist to edit media, such as images, sound, and video.

However, such professional media editing tools are generally very resource-intensive. Even a simple operation, such as adding an extra geometrical object on an image, may require complex algorithm calculations and much greater storage due to an unencoded format necessary for editing. In fact, in addition to an unencoded format, many edits generate a large amount of metadata that itself requires heavy computation for processing and greater storage. Image editing, as an example, has a vast array of features that are not necessary unless the image is being edited. Such features may include layering, masking, rastering, vectorizing, noise reduction processing which uses considerable compute power and increases the eventual storage size.

For this reason, most professional media editing tools are incompatible with a limited-resource environment client system such as mobile devices, Chromebooks®, tablets. Unlike desktop client systems, mobile systems have very limited resources, both computational and memory-wise. Furthermore, the mobile device may even lack special hardware necessary to efficiently perform computation such as a dedicated video processor or other offloading hardware that improves computational speed.

Even if a special hardware is present in a resource-constraint client system, the problem is exacerbated when editing temporal media, for example when editing video and/or audio. In such editing, the volume of data is substantially increased due to the added continuous aspect of temporal media. For example, a high-definition video may have 30 frames per second, meaning to edit just a second of a video, the system has to process changes to 30 different images. Accordingly, the computational and memory power to implement such changes and provide responsive user experience may be substantially more challenging than for still images.

One possible solution for solving the responsiveness issue on limited compute resource environments is a server-offload paradigm, in which a client system, having fewer resources, offloads media editing to a computationally more capable server system. The client system sends the media and the requested changes, through a network, to a server, and the server performs the client system requested changes to the media. The server then sends the modified media back through the network to the client system, and the client system presents the changed media. Although the server assumes the resource-heavy media editing task, such offloading adds a new, network throughput, dimension to the problem, while lessening the impact of the computational problem.

Indeed, transferring the pre-change/changing/changed media through the network may be very taxing and introduce significant latency. In particular, when the media is a video, the client and server systems may have to send 30 full frames in one second to perform and present the changed media on the client system. Such transfer may require thousands of megabits per second connection with low-level latency. Most client systems may not be able to have such connectivity with a server system.

Furthermore, optimizations to conserve network bandwidth, require the client system to download forward dependent frames of video to ensure the smoothness of the video playback within the constraints of the network bandwidth. Accordingly, the resource-constraint client system has to forward buffering 100's or 1000's of frames for an uninterrupted video playback.

For that reason, the offload paradigm introduces responsiveness yet another issue for editing the temporal media. The forward buffering requirement while performing video-editing significantly impairs the user experience. In such an implementation, an edit by the user on a video would be only displayed when the necessary buffer of frames is downloaded and then, played. For example, when adding a text box to a video segment, the text box may not be rendered on the client system until the dependent future frames of the video are downloaded by the client system resulting in unresponsive user experience when editing.

One solution may involve offloading the rendering of the video to the server as well. An example of this solution may be a remote desktop solution installed on the client system. Using the remote desktop solution, the client system connects to a professional editing solution installed on a server system to make changes to media. In such an example, using the remote desktop solution, a user of the client system may perform changes to the media with the professional editing software running on the remote server system.

Although remote desktop solutions may be optimized for acceptable network bandwidth, using the remote desktop solution for temporal media also yields a deteriorated user experience. To maximize the network throughput, remote desktop solutions use lower frame rates and frequently drop media packets. Accordingly, the client system receives a low-quality remote desktop video stream of the media being edited on the server system. The mismatch between the frame rate of the remote desktop video streaming and the edited video media may appear choppy in the presentation, especially when a substantial number of frames are dropped frames. This may be unacceptable, especially for editing, as the change to the media may require high resolution to be visible/audible.

BRIEF DESCRIPTION OF THE DRAWINGS

In the drawings of certain embodiments in which like reference numerals refer to corresponding parts throughout the figures.

DETAILED DESCRIPTION

Figure 1:
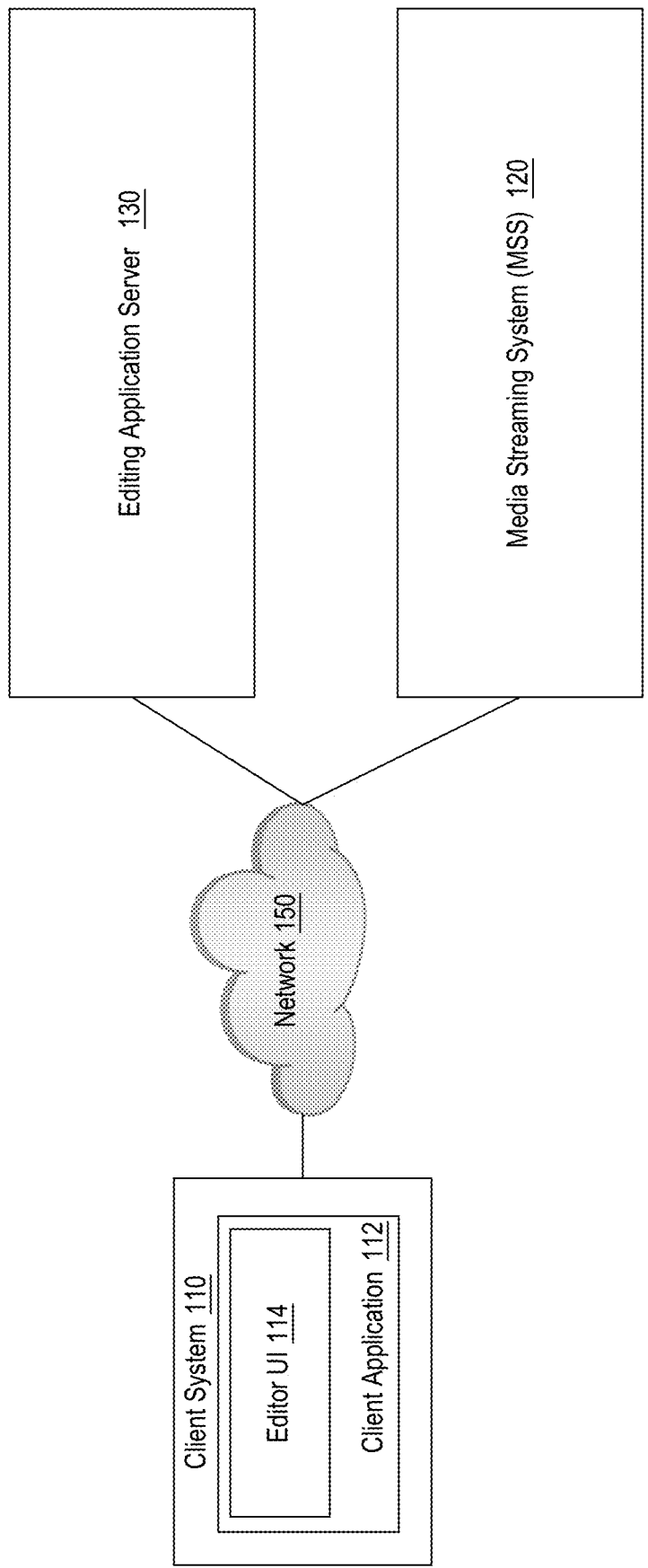
FIG. 1 is a block diagram that depicts a media editing and adaptive streaming system (MEASS), in one or more embodiments.

In the following description, for the purposes of explanation, numerous specific details are set forth in order to provide a thorough understanding of the present invention. It will be apparent, however, that the present invention may be practiced without these specific details.

In other instances, structures and devices are shown in block diagram form in order to avoid unnecessarily obscuring the present invention.

General Overview

The approaches herein describe adapting the format of streaming media based on user interaction with the media. The term "stream" refers to transferring media or a portion thereof from one computing system to another computing system through a data network and may be used to denote the transfer for both temporal media (e.g., video media) and non-temporal media (e.g., images).

Using techniques described herein, media may be streamed in different formats to a client system for presentation. The format in which the media is streamed may depend on the received request for interaction with the media at a client system. In particular, the system may determine the amount of change, if any, that was requested as part of the interaction and the actual amount of change that was performed on the media as the result of the request. Based at least in part on the change(s) or existence thereof, the system selects the format in which the media is streamed by the media server to a client system. Using the techniques described herein, the system adapts the media format for streaming to be performance-optimized for requests that cause little or no change and bandwidth-optimized for the requests that cause greater change.

In an embodiment, a client system may present a user interface (UI) for selection, presentation, and editing of media. Such a UI may include UI control(s) for initiating requests for performing such action and more granular actions on the media. Based on the interaction with the UI controls, the client system may generate change request data describing the requested interaction with the media, in an embodiment. The term "change request data" refers herein to the data describing the interaction(s) requested to be performed on the media. The change request data may include request(s) ranging from a further presentation of media to a substantial change to the media's properties.

For example, a client system may display UI with UI control(s) to modify one or more frames of video media. User interaction with the UI controls is captured as a request to modify the frames (e.g., new mask, change of contrast, addition of an object). The client system generates change request data describing the change(s) requested to the frame(s) and sends the change request data to the server system that performs the modification. In an embodiment, the frames to be modified may also be sent to the server system as part of the change request data. The server system, having greater computational power, performs the modification and generates a modified version of the media.

In an embodiment, the server system determines the format in which to send the media and/or a modified version thereof to the client system. The server system may determine the amount of the change requested based on the change request data received from the client system and/or based on the amount of the actual modification performed to the media. The greater amount the change is, the more performance-optimized format is selected, and the lesser is the change (if any), the more bandwidth-optimized format is selected. The server system performs the formatting of the media or the portion thereof in the determined format and initiates streaming of the media to the requesting client system for presentation.

Performance-Optimized Format and Bandwidth-Optimized Format

The term "performance-optimized format" refers herein to a format of media that is optimized for the speedy presentation of the media on a client computer system. As discussed above, media and its streams contain a large amount of information and thus, have a large memory size and require significant bandwidth when streamed. For that reason, media is compressed and/or down sampled when transferred, collectively and/or individually referred to herein as encoding. Conversely, the decompressing and upscaling, is collectively and/or individually referred to herein as decoding.

As discussed, certain media encoding may introduce requirements for buffering media stream portions on client system to satisfy stream's transfer rate over the network. Without such buffering, the media may not be adequately presented on the client system. For example, an encoded video portion that is already received by a client system may require a subsequent portion of the encoded video. If such subsequent portion is not received by the client system, the received portion may not be presented on the client system or may be presented pixelated due to missing information. Accordingly, encoding may introduce forward dependency for the media, which may cause lag in responsiveness, especially while editing.

Furthermore, the client computer system has to perform additional processing, such as decoding, decompressing, reconstruction, interpolating, and/or upscaling, to present the media. These operations are generally resource-heavy operations as well and thus, require the client system to spend its limited computing resources (e.g., CPU cycles, system memory, I/O) for the presentation of media. If computing resources are not enough, the presentation may see lag, skipping, pixilation, and other unwanted effects that decrease the quality for a user of the client system.

On the other hand, when media is in its original format (the format in which the media was originally captured/generated), the client system may avoid forward dependency and performing additional processing to present the media on the client system and thus, have greater performance and improved usability. For that reason, the original format of media is a non-limiting example of a performance-optimized format and, therefore, exhibits higher performance for presenting the media on the client system.

Another non-limiting example of a performance-optimized format for a video stream is having key frame(s) (e.g., at a shorter interval) more than other types of frames in the stream. Such frames, although encoded, are decoded independently of other frames in the video stream, and accordingly, require no temporal prediction and/or reconstruction based on prior or future frames in the video stream. Therefore, the video stream format that (frequently) contains key frames is a performance-optimized format, which, although greater in size, requires less computing resources for decoding and is responsive.

The term "bandwidth-optimized format" refers to the format of media that is optimized for the transfer of the media over a network to client system(s), i.e., media streaming. Unlike performance-optimized format, media or the stream thereof is lessened in size by lessening the quality of the media or removing information that can be reconstructed during the presentation.

Various techniques may be used to perform formatting into a bandwidth-optimized format (e.g., different compression, downscaling, and/or downsampling algorithms). Utilizing those techniques significantly reduces the bandwidth necessary to transmit the media over the network from a server system to the client system(s). However, upon receipt of the media in a bandwidth-optimized format at a client system, the client system has to spend computing resources reconstructing the media for the presentation. Thereby, the advantage of saved bandwidth negatively affects the consumption of computing resources on the client system(s).

In an embodiment, the media format, bandwidth-optimized or performance-optimized, is selected by selecting a corresponding codec out of the available codecs to transmit the media to the client system(s) over a network. Codec is a type of encoding/compression and the respective implementing hardware/software component(s). Non-limiting examples of codecs for video media are H.264 and Motion JPEG. Non-limiting examples of encodings for images are JPEG, PNG, TIFF. Non-limiting examples of codecs for audio streams are MP3, AAC, AC3.

The settings selected for a codec may also affect whether the format is bandwidth-optimized or performance-optimized. For example, maximum resolution, compression level, bitrate affect the size and decoding of the media. Accordingly, depending on the selected profile of settings for the codec, the media may be formatted into a bandwidth-optimized format or performance-optimized format.

In an embodiment, for a video stream, the format is selected by selecting the type of video frame(s) to generate. A performance-optimized format for video media may be generated by utilizing pre-requisite-based frames (e.g., "P" frames), which require a prior frame, such as a key frame (e.g., "I" frames), in the video stream for decoding. A bandwidth-optimized format may be generated by utilizing post-requisite-based frames (e.g., "B" frames), which require a temporally subsequent, future frame for decoding. The subsequent, future frame may be a pre-requisite-based frame and/or a key frame (e.g., "I" frames). The post-requisite-based frames yield a large compression ratio, and therefore, the video stream that utilizes more of such frames is in bandwidth-optimized format.

As a non-limiting example, a performance-optimized format may include 98% pre-requisite-based frames, "P" frames, and 2% key frames, "I" frames, and bandwidth-optimized format may include 98% post-requisite-based frames, "B" frames, and 2% key frames, "I" frames.

In an embodiment, the optimized media format is determined and selected from a spectrum of formats that ranges from more performance-optimized to more bandwidth-optimized. For example, a combination of parameters may determine the type of format for video media. Such parameters may include an encoding level, frame size, frame type, key frame interval, and bit rate. A combination of one or more of these parameters and respective parameter value(s) may yield more or less performance or bandwidth-optimized format for a video stream.

System Overview

FIG. 1 is a block diagram that depicts media editing and adaptive streaming system (MEASS) 100, in one or more embodiments. MEASS 100 includes editing application server 130 and media streaming system (MSS) 120. Editing application server 130 and/or MSS 120 may be hosted on the same physical computer system or multiple computer systems connected through a digital data telecommunications network, such as network 150.

MEASS 100 may include one or more client systems, such as client system 110, that connect to editing application server 130 and/or MSS 120 through network 150. Although a single component of each type is depicted in FIG. 1, in various embodiments, an arbitrary number of client system 110, editing application server 130, MSS 120, and network 150 may be connected through network(s) within MEASS 100. In fact, a practical environment may have many more, perhaps several dozens or hundreds of the aforementioned elements, particularly a great number of client systems.

Client system 110 hosts client application 112, executing which displays editor UI 114 on client system 110, in an embodiment. Editor UI 114 displays the media to be edited and one or more UI controls for performing the editing and presentation of the media. Upon media selection, media for editor UI 114 may be streamed to client system 110 from media streaming service (MSS) 120 through network 150.

Additionally, client system 110 may connect to editing application server 130 through network 150. Editing application server 130 services requests from client system 110 to modify media. Based on such requests, editing application server 130 performs modification to the streamed media, in an embodiment. Accordingly, rather than client system 110 using its limited local computing resources to modify media, the resource-heavy modification of media is performed by editing application server 130.

In an embodiment, editing application server 130 transmits the modified media or the modified portion thereof to MSS 120 to be streamed to client system 110. Editing application server 130 determines the format in which to transmit the modified version and requests MSS 120 to stream to client system 110 the media (modified or not) in the determined format. MSS 120 hosts a streaming service that streams the media to client system 110.

Accordingly, the requested media interaction(s) within editor UI 114 of client application 112 of client system 110 may be performed by editing application server 130 and streamed by MSS 120 in the format managed by editing application server 130. A non-limiting example of client application 112 is a web application (e.g., a web browser) that connects to a web server that may be hosted by editing application server 130. The web server may fully or partially provide information necessary to render editor UI 114 (e.g., HTML) and client-side code to execute (e.g., JAVASCRIPT) for an interactive editor UI 114. Based on the user input through the rendered editor UI 114, the web server receives the interaction request(s) for modifications of media (e.g., over HTTP or web sockets).

In another embodiment, client system 110 is a mobile computer system hosting a mobile application, client application 112. The mobile application may connect using REST and/or other APIs with editing application server 130 and/or MSS 120 to receive information for generating editor UI 114, to request selection of media, and to request editing and streaming of the requested media.

Functional Overview

Figure 2:
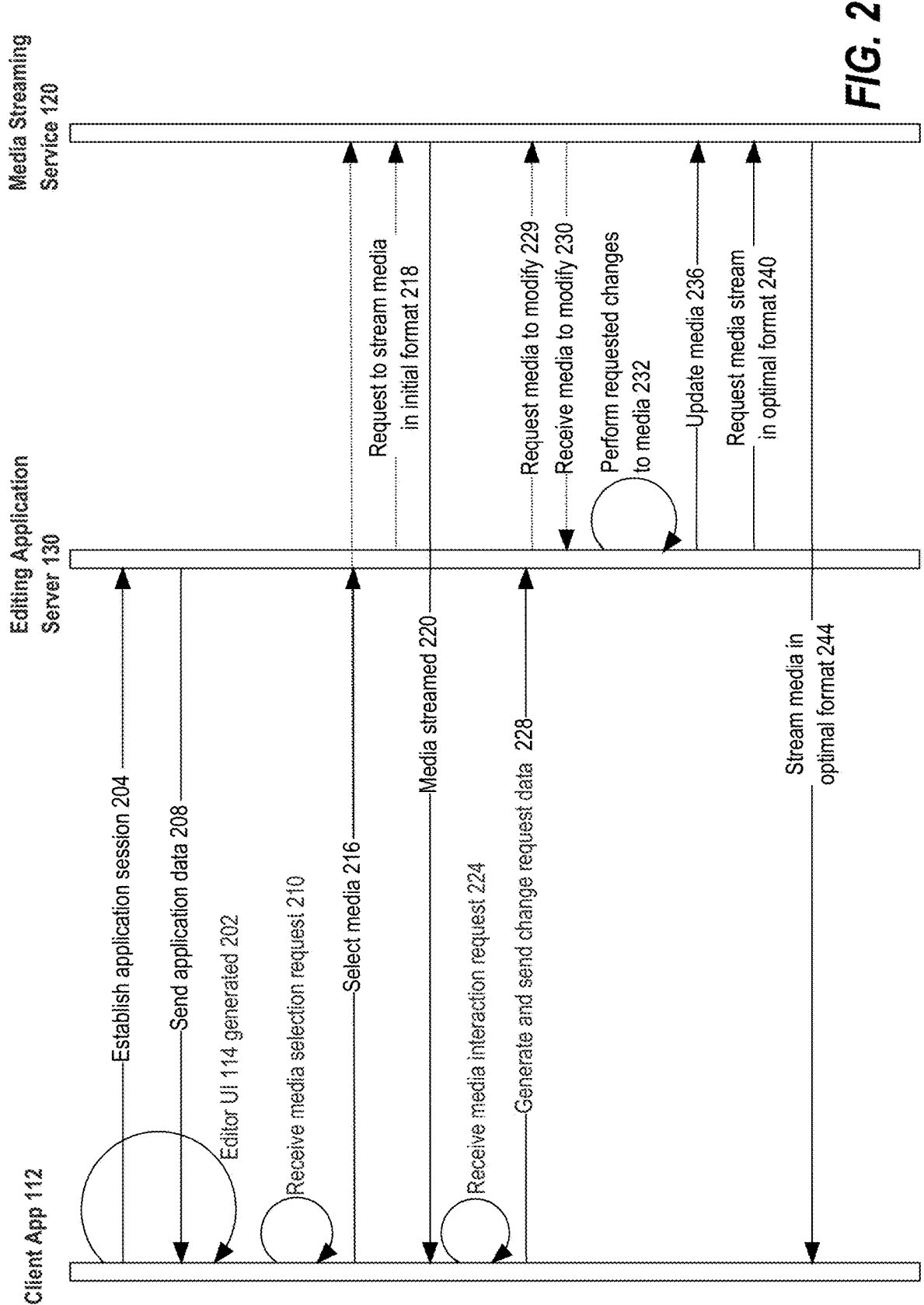
FIG. 2 is a sequence diagram that depicts the process(es) for editing and streaming media, in one or more embodiments.

In an embodiment, client system 110 performs series of requests and receives series of responses for editing and streaming media in an optimal format. FIG. 2 is a sequence diagram that depicts the process(es) for streaming media in an optimal format to client application 112 of client system 110, in one or more embodiments. One or more of the steps described below may be omitted, repeated, and/or performed in a different order. Accordingly, the specific arrangement of steps shown in FIG. 2 should not be construed as limiting the scope of the invention.

At step 202, upon a request from a user associated with client system 110, client application 112 initiates editor UI 114 to enable the user to select and interact with media. Client application 112 may establish an application session with editing application server 130, at step 204. Using the established session, at step 208, client application 112 receives application data at step 208 for rendering editor UI 114.

Application data may include user data related to the user, such as user-specific customization(s) of editor UI 114, list of media items, historical and/or personal information related to the user, and user request(s). In one embodiment, the application data further includes UI data to present various UI controls for user interaction at client system 110. For example, application data may include HTML, elements (e.g., menus, backgrounds, and shapes) for rendering editor UI 114 on client system 110.

Figure 3A:
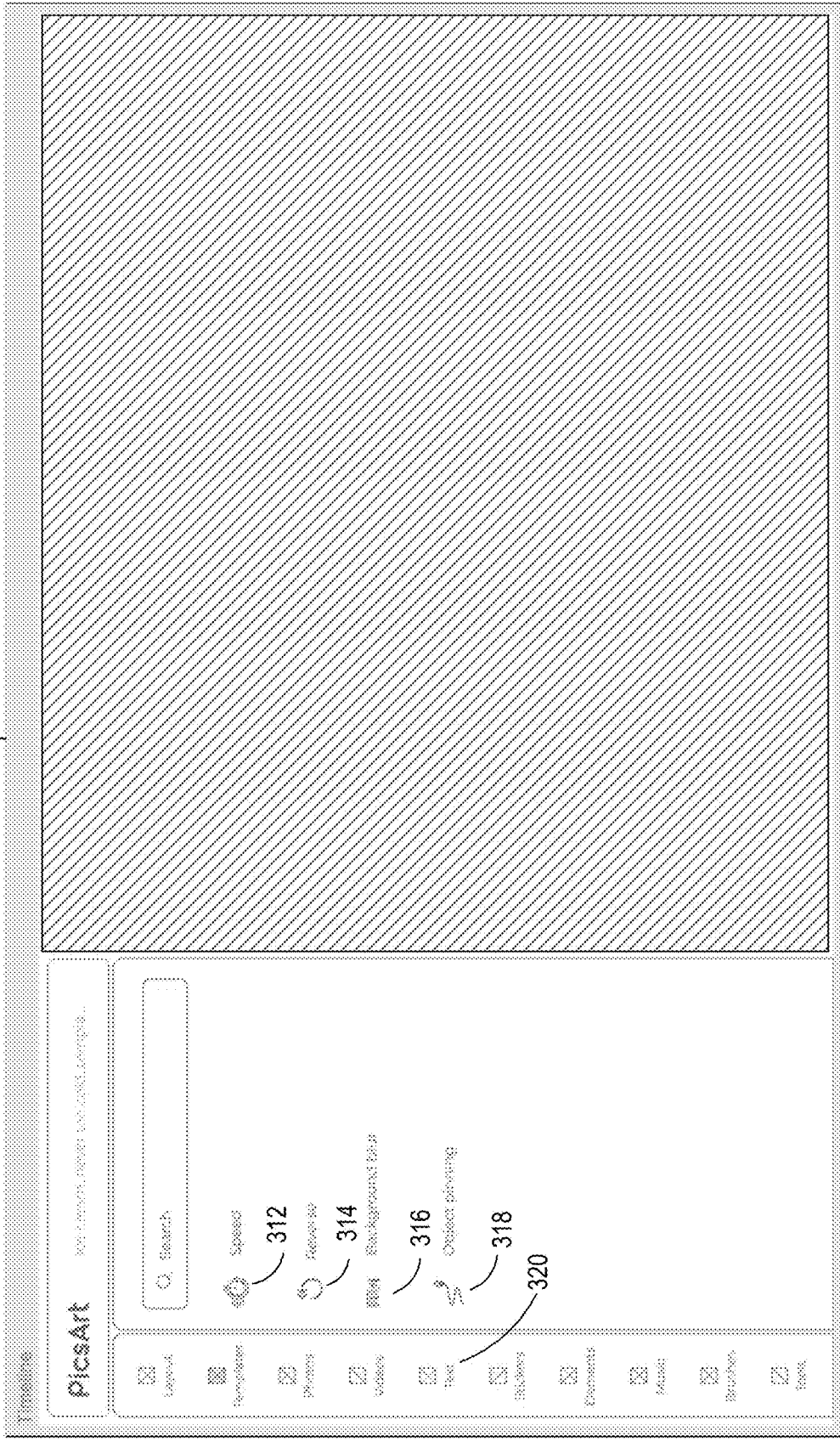
FIGS. 3A-C are block diagrams that depict an example media editor user interface (UI) in one or more embodiments.

FIG. 3A is a block diagram that depicts an example of editor UI 114, in an embodiment. In FIG. 3A, UI elements are depicted, such as example UI controls 312-320, for a user to interact with media. Each of UI controls 312-320 may request different editing operations to be performed on media. For example, UI control 320 enables users to add text boxes.

Continuing with FIG. 2, at step 210, client application 112 of client system 110 receives input selecting the media to interact with. Client application 112 sends the selection request to editing application server 130, at step 216, which requests MSS 120 to stream the media to client application 112, at step 218, in an embodiment.

Alternatively, at step 216, client application 112 may directly request MSS 120 to stream the media without sending the request editing application server 130. Regardless of whether the request to stream is propagated through editing application server 130 or directly to MSS 120, the requested media is yet to be modified and, thus, is in its original form. Accordingly, MEASS 100 selects a bandwidth-optimized format for streaming the media to client application 112 of client system 110.

Figure 3B:
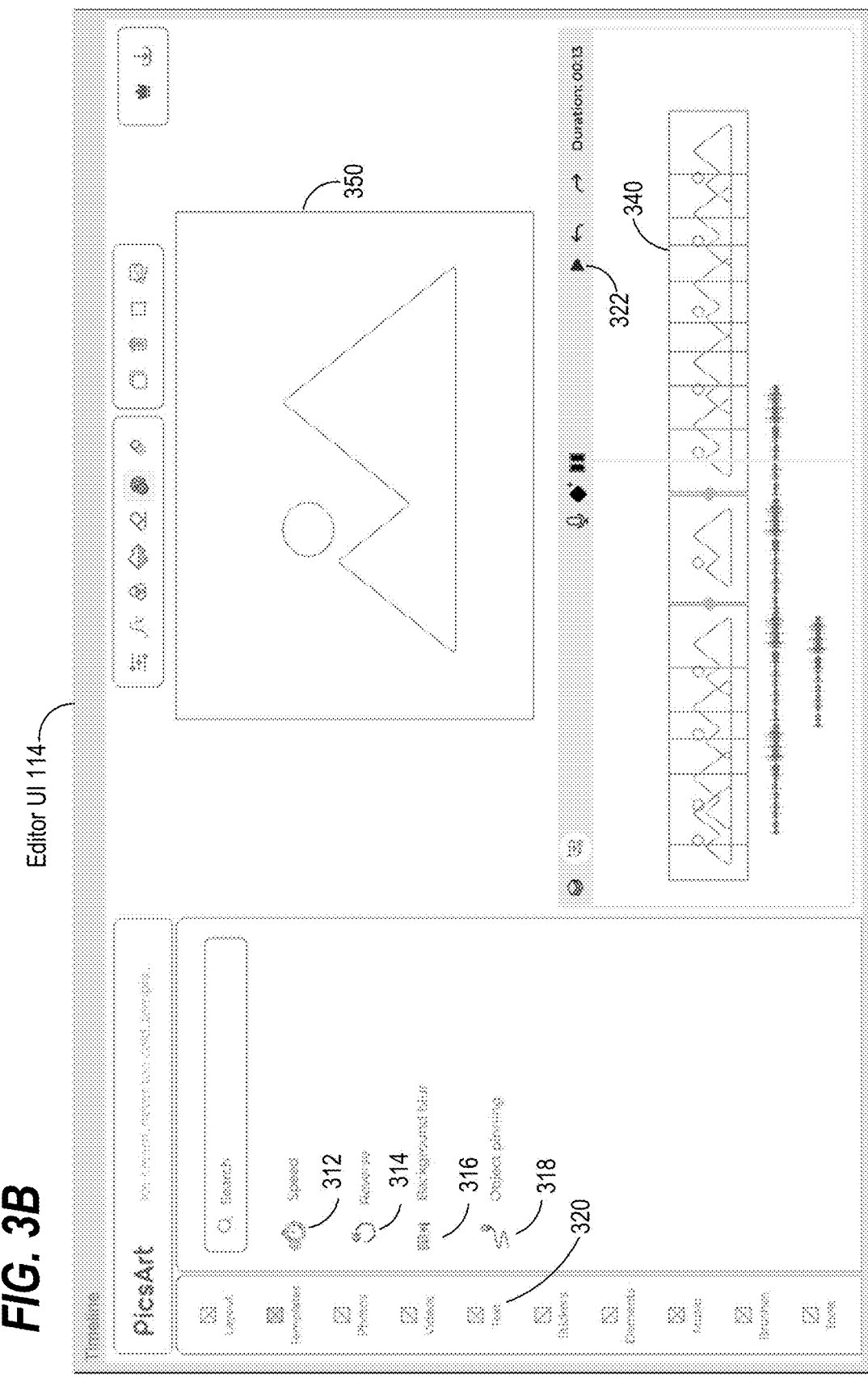

At step 220, client application 112 receives a stream of media and renders at least a portion thereof within editor UI 114. FIG. 3B is a block diagram that depicts an example of editor UI 114 displaying a video stream that can be modified by client application 112, in an embodiment. More frames of the video stream may be requested through play button UI control 322. Since the additional frames are yet to be modified, those frames as well may be streamed from MSS 120 in a bandwidth-optimized format.

At step 224, client application 112 may receive interaction input that requests modification of media or a portion thereof (e.g., displayed portion of the media). FIG. 3B is a block diagram that depicts non-limiting examples of various UI controls on editor UI 114 interaction with which may generate a request to modify. For example, an interaction with UI control 320 may generate a request to place a text box element on frame 350 of the displayed video stream.

Based on the received interaction request(s), client application 112 generates change request data and sends the change request data to editing application server 130, at step 228. In an embodiment, the change request data is generated when a confirmation input is received for the requested interaction. In another embodiment, client application 112 determines that the interaction request has been completed, and the change request data is generated based on the completed interaction request.

In one embodiment, client application 112 includes in the change request data the media or the portion of media, which was interacted with. The change request data is sent to and received by editing application server 130, at step 216. In another embodiment, client application 112 includes in the change request an identifier of the media or the portion thereof that was interacted with without including the media or the portion itself in the change request data. In such an embodiment, editing application server 130 requests the media or the portion thereof from MSS 120 using the received identifier, at step 229. At step 230, editing application server 130 receives from MSS 120 the media or the portion of the media.

Figure 3C:
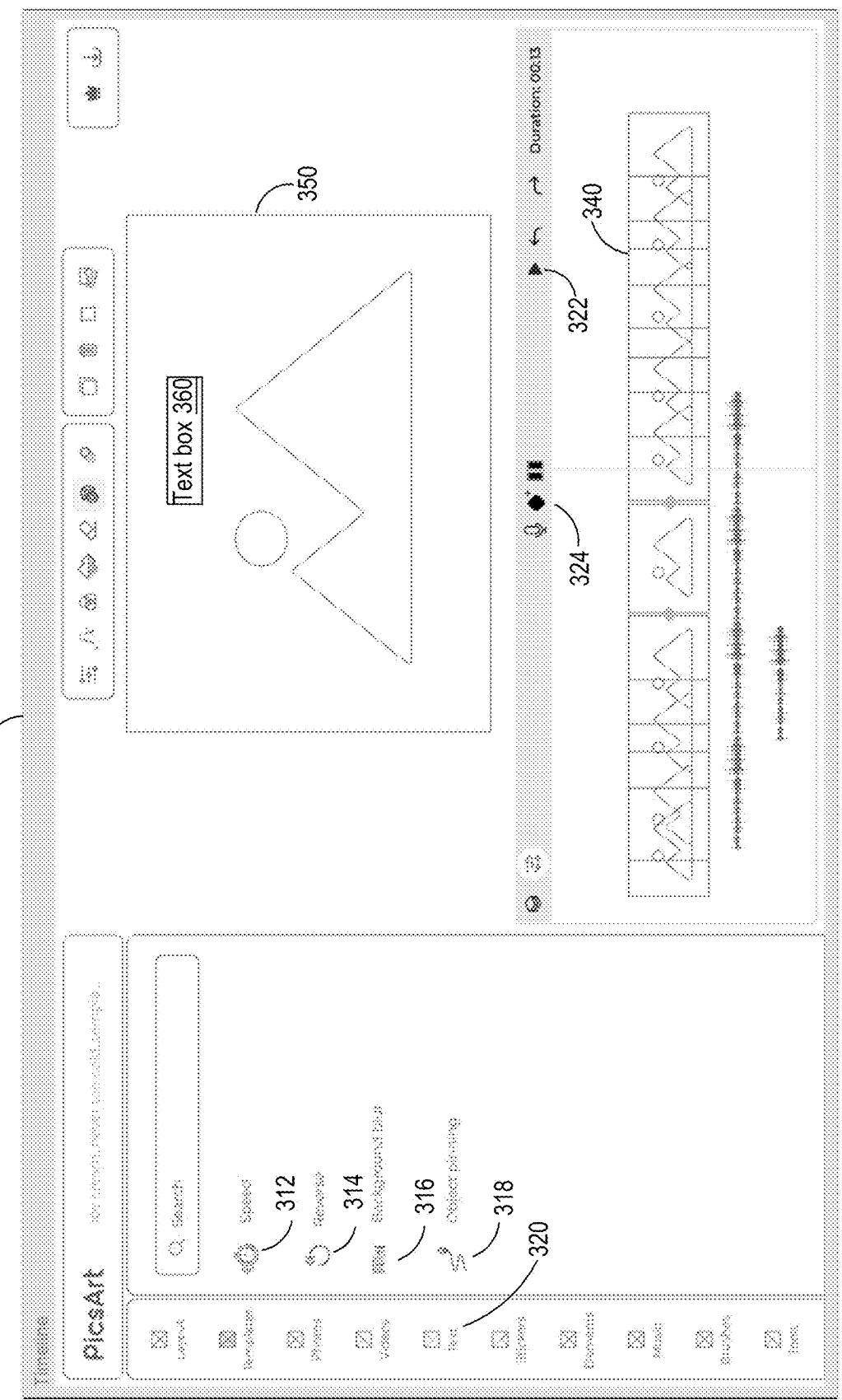

FIG. 3C is a block diagram that depicts a non-limiting example of editor UI 114 that generates change request data, in an embodiment. When client application 112 receives a selection for UI control input 320, text box 360 may be displayed on selected frame 350 of video stream 340 in editor UI 114. User input may be received for the text within text box 360, and the user may modify the location of the text box within the frame.

When the interaction for text box 360 on editor UI 114 is completed, client application 112 generates change request data for the interaction. The change request data includes information about the text box 360 and text box 360 placement on video frame 350. The change request data may include frame 350 or may include multiple frames that include frame 350 from video stream 340. Alternatively, the change request data may include an identifier(s) for frame 350 and other frames from stream 340 to be modified. The change request data may be generated and sent to editing application 130 when the user completes the entry for text box 360 or when a user confirms the completion by another UI control (e.g., 322 or 324).

Continuing with FIG. 2, editing application server 130 performs the requested changes to the media at step 232 and replaces the initial version of media or a portion thereof with the updated one, at step 236. As discussed herein, the performance of the modification is resource-heavy operation, and therefore, editing application server 130 having greater computing resources performs media modification instead of client application 112 that runs on resource-limited client system 110.

Non-limiting examples of media modifications may include editing application server 130 modifying an image-based media to improve blurriness, change contrast/color, add a mask, or select/crop/add objects, among others. Similar modification(s) may be performed to a video stream with additional temporal modification such as changing the speed of frames, reversing frames, or inserting/deleting frames, among many others. Other forms of media may be edited as well. For example, editing application server 130 may modify audio media to remove noise, add background music, or insert additional audio.

As a result of editing, application server 130 generates a new version of the media for MSS 120 to stream. MSS 120 streams the new version of media in an optimal format to client application 112, at step 244, for rendering on editor UI 114.

Determining Optimal Media Format

In an embodiment, the optimal format is determined based on the amount of change from the initial version of the media to the modified version of the media. The amount of change may be mapped to a spectrum of available optimal formats for streaming of the media. A greater amount of change is mapped to a more performance-optimized and less bandwidth-optimized format, and a lesser amount of change is mapped to a less performance-optimized and more bandwidth-optimized format. The mapping for the selection of the format may be performed with a linear or non-linear function (e.g., threshold-based, see FIG. 4) with the amount of change as a parameter.

For example, video stream formats' spectrum may be based on the number of frames of different types included within an interval of the video stream. Such an interval of a video stream may have a different arrangement of key frame(s), post-requisite-based frame(s), and/or pre-requisite-based frame(s). The more bandwidth-optimized format may include a greater number of post-requisite-based frames or a greater number of pre-requisite-based frames. The more performance-optimized format may include a greater number of key frames. Accordingly, the number of each type of frame within an interval (and thus the format) may be determined as a function of the amount of change.

Additionally or alternatively, the optimal format may be based on the type of change, the affected portion of media by the change, the available bandwidth between client system 110 and MSS 120, and/or the configuration settings for the presentation of media on client system 110.

Figure 4:
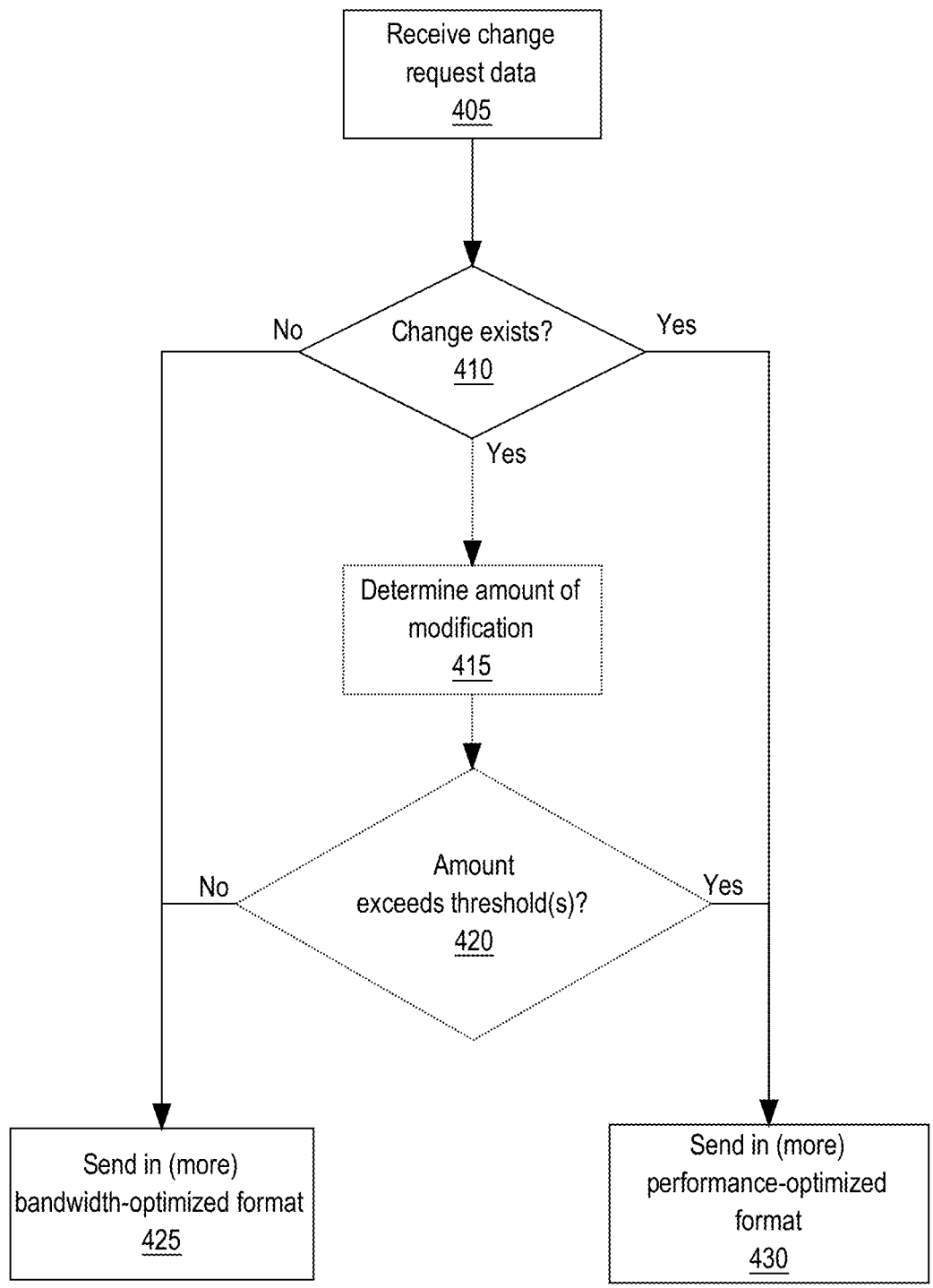
FIG. 4 is a block diagram that depicts a process for determining an optimal format in which to stream media to a client system, in one or more embodiments.

FIG. 4 is a flow diagram that depicts a process for determining an optimal format in which to stream media to client system 110, in one or more embodiments. The process may be performed by a computing system such as editing application server 130 or MSS 120. One or more of the steps described below may be omitted, repeated, and/or performed in a different order. For example, steps 415-420 may be completely omitted as shown in dotted lines. Accordingly, the specific arrangement of steps shown in FIG. 4 should not be construed as limiting the scope of the invention.

At step 405, the process receives change request data generated based on interaction request with media on remote client application 110. In some embodiments, the change request data may be generated at client application 110 even when no change is made to the media itself. For example, when media includes multiple media items such as both audio and video streams, the modification request may be for the audio media, while the selected media item for which the format is to be determined is the video media or vice versa.

In a different example, the interaction with the media at client application 110 may be a non-altering one. However, such a non-media-altering interaction may still cause a request to stream media from MSS 120, for which an optimal media format is to be determined. For example, the process may receive a playback request for a video stream that does not include any modification to the media from client application 110. Yet, the process may make the determination on the format in which to stream the media for the playback.

In such embodiments, based on the request type and/or contents of change request data, at step 410, the process may determine that no change exists. The process then directly proceeds to select a bandwidth-optimized format at step 425, skipping the amount determination step, 415. The process may select the most bandwidth-optimized format to stream media from MSS 120 to client application 110.

At step 410, the process may determine that the media has been changed, and because the change has to be played back immediately without delay on a client system, a performance optimized format of media is selected at step 430. For example, for any change to a video, no post-requisite frame(s) ("B" frames) are used, rather the process may select key frame(s) and/or pre-requisite frame(s).

Alternatively or additionally, the process may proceed to step 415 to make a (further) determination on the format based on the amount of change. At step 415, the process determines the amount of change requested to the media by the received change request data. The process may do so based on analyzing the received change request data itself. For example, for a video frame or an image, when the change request data specifies that the modification requested is a contrast change, then the process may determine that the full-frame/image is affected. Similarly, when the change request data specifies that a noise reduction is to be applied to audio media, the full media may be determined to be expected to change. On the other hand, if an object has been added to an image or a video frame, then the size of the object may determine the amount of change.

Additionally or alternatively, the process may determine the amount of change based on performing the modification requested in the change request data to the media. The amount of change may be measured while performing the modification. Alternatively, the amount of change to the media may be measured by comparing the initial version of the media with the new version of the media. For example, for a video frame or an image, the new version of the image may be compared to the received version of the image to determine the number of pixels that have changed.

At step 420, the amount of change to the media is compared to at least one threshold, in an embodiment. If the changes are determined to exceed the appropriate threshold, then the process proceeds to block 430. At block 430, a performance-optimized format is selected for the media to be streamed to client application 112. Otherwise, if the changes are determined to be below the appropriate threshold, then the process proceeds to step 425. At step 425, a bandwidth-optimized format is selected for the media to be streamed to client application 112.

In one embodiment, the threshold is based on the proportionality of the change to the media. For example, a threshold may be set to 50% of pixels of a video frame or an image. If the change performed by editing media amounts to greater than 50%, then a performance-optimized format is selected. If the change amount fails to exceed 50%, then a bandwidth-optimized format is selected.

Additionally or alternatively, the threshold may be based on the portion(s) of the media that are modified. Each portion of the media may be assigned a different threshold. A more critical portion of the media may have a lower threshold than a less critical portion of media. For example, for an image or a video frame, the central portion may have a lower threshold than the portion(s) closer to the edges. Accordingly, even if a lesser amount of change is done, but that change is to the central portion, a performance-optimized format may be requested. Conversely, if a greater amount of change was done to the edge portion, the threshold for the edge portion being higher may not be exceeded. Therefore, a bandwidth-optimized format may be selected for the edge portion modified image/frame.

Additionally or alternatively, the threshold may depend on the type of the change(s). For example, when the gain of a sound media is changed, the threshold may be lower than when noise is removed. Therefore, the changes to the gain may be streamed using bandwidth-optimized format rather than the noise removal changes may be streamed in performance-optimized format. The threshold may depend on other factors such as the network bandwidth available for streaming, streaming configuration on client application 112, and/or streaming configuration on the streaming service of MSS 120.

In an embodiment, at step 420, the process may evaluate the amount of change against multiple thresholds. In such an embodiment, the optimal format is selected from a range of formats: from more bandwidth-optimized to more performance-optimized. The number of ranges for the amount of change defined by the thresholds may correspond to the number of available formats. Accordingly, each available format is mapped to a specific range of thresholds. For example, when the amount of change exceeds the highest threshold, then the most performance-optimized format is selected from the range of available media formats.

For a video stream, to select an optimal format, each threshold range may correspond to a particular format of a video stream. Such a video stream is formatted at least in part by selecting a number of frames in an interval and/or type of such frames, in an embodiment. For example, if the amount of change exceeds the highest threshold, then key frames are sent more frequently (more key frames within the same interval). On the other hand, if the amount of change is below the lowest interval, then post-requisite-based frames are more frequently sent with a key frame sent at a longer interval. In case the amount of change is within a particular range of thresholds, based on the distance of the particular range from the highest threshold and/or the lowest threshold, the number of key frames and/or a number of post-requisite-based frames are proportionally replaced by another type frame. The greater is the difference between the highest threshold and the particular range, the more of the key frames are replaced by pre-requisite-based frames and/or post-requisite-based frames.

Software Overview

Figure 5:
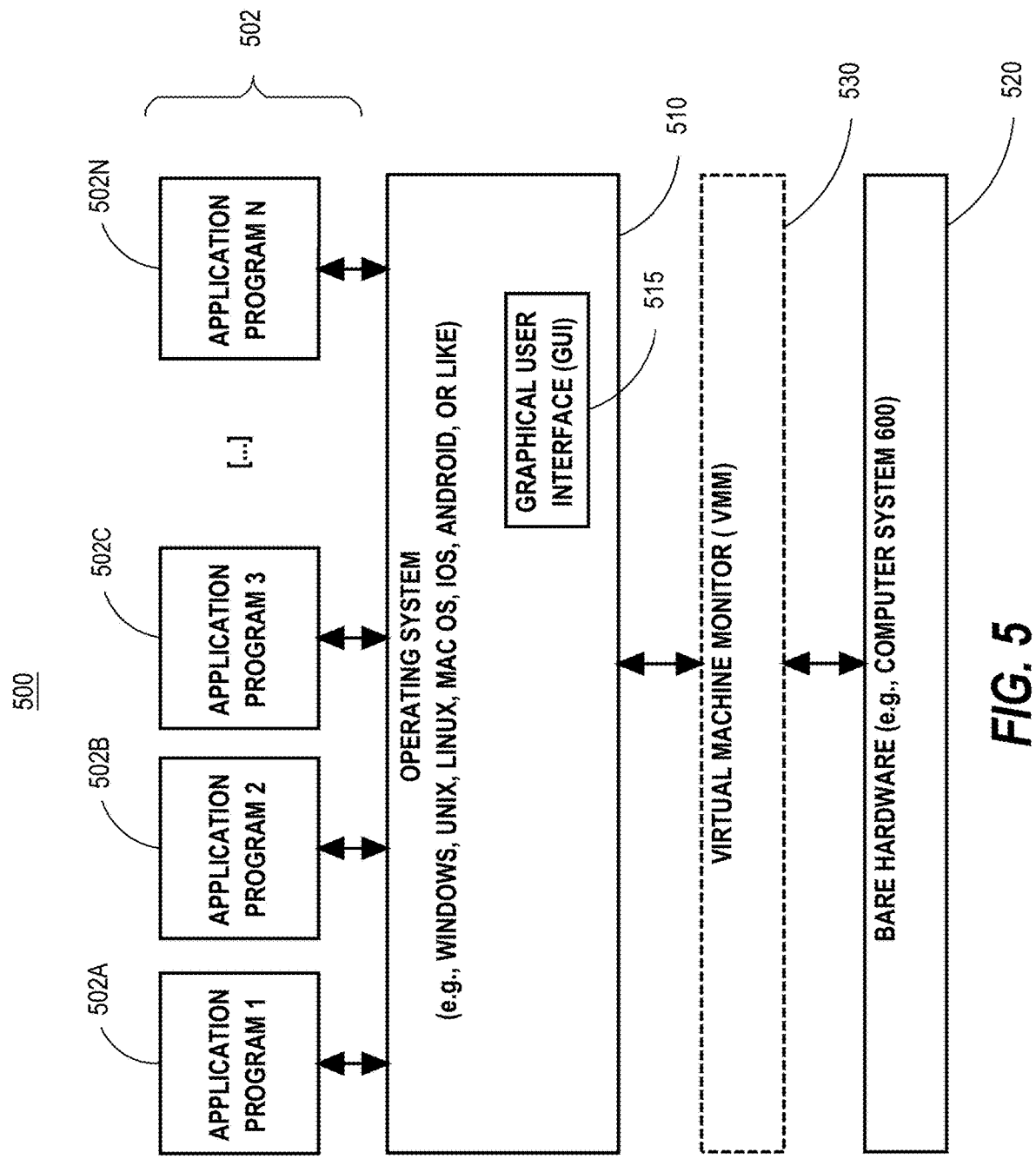
FIG. 5 is a block diagram of a basic software system, in one or more embodiments.
Figure 6:
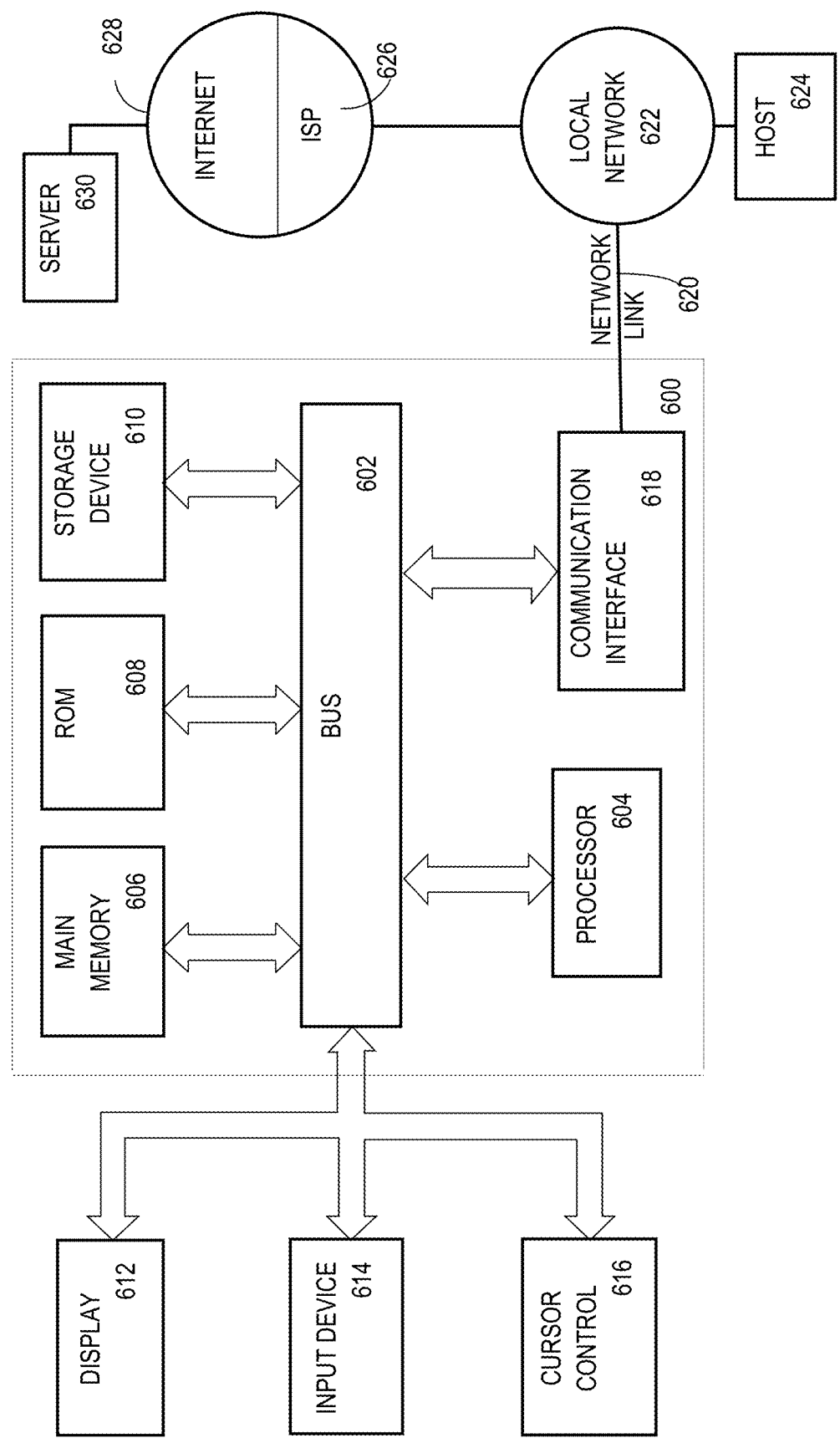
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs represented as 502A, 502B, 502C . . . 502N may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field-programmable gate arrays (FPGAs) that are persistently programmed to perform the techniques or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information and a hardware processor 604 coupled with bus 602 for processing information. Hardware processor 604 may be, for example, a general-purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during the execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware, and/or program logic, which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through Internet 628, ISP 626, local network 622, and communication interface 618.

The received code may be executed by processor 604 as it is received and/or stored in storage device 610 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, by a client computer system, a first version of media in a first media format;
   capturing, by the client computer system, one or more interactions with a user interface that displays one or more portions of the first version of the media;
   based on capturing, by the client computer system, the one or more interactions with the user interface that displays the one or more portions of the first version of the media, generating, by the client computer system, a change request data for the first version of the media;
   sending, by the client computer system, the change request data for the first version of the media;
   receiving, by the client computer system, the media in a second media format different from the first media format, wherein the second media format of the media is based at least in part on determining whether the change request data includes a request to modify at least a portion of the first version of the media by editing content of at least one image frame of a video stream of the media and, thereby, to generate a second version of the media.

2. The method of claim 1, wherein:
   the change request data at least in part describes the request to modify the first version of the media to the second version of the media;
   the second version of the media is generated by modifying the first version of the media to the second version of the media based at least in part by performing the request to modify the first version of the media to the second version of the media; and
   the method further comprising:
   receiving, by the client computer system, the second version of the media in the second media format different from the first media format.

3. The method of claim 1,
   wherein the first media format of the media is a bandwidth-optimized format and the second media format of the media is a performance-optimized format, or
   wherein the first media format of the media is a performance-optimized format and the second media format of the media is a bandwidth-optimized format.

4. The method of claim 1, wherein the second media format is different from the first media format and the media in the second media format includes a plurality of video frames with at least one pre-requisite-based frame and with at least one frame that is prior to and required by the at least one pre-requisite-based frame for decoding.

5. The method of claim 1, wherein the second media format is different from the first media format and the media in the second media format includes a plurality of video frames with at least one post-requisite-based frame and with at least one frame that is subsequent to and required by the at least one post-requisite-based frame for decoding.

6. The method of claim 1, wherein the media includes an audio stream, and the media in the first media format has a different compression than in the second media format.

7. The method of claim 1,
   wherein the request to modify the first version of the media includes one or more actions including: modifying at least one property value of the media, modifying at least one element of the media, adding at least one element to the media, and deleting at least one element from the media; and
   wherein the one or more actions cause the second media format to be a performance-optimized format.

8. The method of claim 1, wherein an amount of the modification to at least the portion of the first version of the media determines whether the second media format is a performance-optimized format or a bandwidth-optimized format.

9. A computer-implemented method comprising:
sending, to a client system, a first version of media in a first media format;
receiving, from the client system, a change request data for the first version of the media generated by the client system;
determining whether the change request data includes a request to modify the first version of the media to a second version of the media;
based at least in part on determining whether the change request data includes the request to modify at least a portion of the first version of the media by editing content of at least one image frame of a video stream of the media and, thereby, to generate the second version of the media, sending, to the client system, the media in a second media format different from the first media format.

10. The method of claim 9, further comprising:
determining that the change request data includes the request to modify at least the portion of the first version of the media;
performing the request to modify at least the portion of the first version of the media thereby generating the second version of the media;
determining an amount of a change to the media from the first version of the media to the second version of the media;
based at least in part on the amount of the change to the media, determining to send the second version of the media to the client system in the second media format; and
sending, to the client system, the second version of the media in the second media format.

11. The method of claim 9,
wherein the first media format of the media is a bandwidth-optimized format and the second media format of the media is a performance-optimized format, or
wherein the first media format of the media is a performance-optimized format and the second media format of the media is a bandwidth-optimized format.

12. The method of claim 9, wherein the second media format is different from the first media format and the media in the second media format includes a plurality of video frames with at least one pre-requisite-based frame and with at least one frame that is prior to and required by the at least one pre-requisite-based frame for decoding.

13. The method of claim 9, wherein the second media format is different from the first media format and the media in the second media format includes a plurality of video frames with at least one post-requisite-based frame and with at least one frame that is subsequent to and required by the at least one post-requisite-based frame for decoding.

14. The method of claim 9, wherein the media includes an audio stream, and the media in the first media format has a different bitrate than in the second media format.

15. The method of claim 9,
wherein the request to modify the first version of the media to the second version of the media includes one or more actions including: modifying at least one property value of the media, modifying at least one element of the media, adding at least one element to the media, and deleting at least one element from the media.

16. A system comprising:
one or more processors;
one or more storage media storing a set of instructions, which, when executed by the one or more processors, cause:
receiving, by a client computer system, a first version of media in a first media format;
capturing, by the client computer system, one or more interactions with a user interface that displays one or more portions of the first version of the media;
based on capturing, by the client computer system, the one or more interactions with the user interface that displays the one or more portions of the first version of the media, generating, by the client computer system, a change request data for the first version of the media;
sending, by the client computer system, the change request data for the first version of the media;
receiving, by the client computer system, the media in a second media format different from the first media format, wherein the second media format of the media is based at least in part on determining whether the change request data includes a request to modify at least a portion of the first version of the media by editing content of at least one image frame of a video stream of the media and, thereby, to generate a second version of the media.

17. The system of claim 16, wherein:
the change request data at least in part describes the request to modify the first version of the media to the second version of the media;
the second version of the media is generated by modifying the first version of the media to the second version of the media based at least in part by performing the request to modify the first version of the media to the second version of the media; and
the set of instructions comprises instructions, which, when executed by the one or more processors, further cause receiving, by the client computer system, the second version of the media in the second media format different from the first media format.

18. The system of claim 16,
wherein the first media format of the media is a bandwidth-optimized format and the second media format of the media is a performance-optimized format, or
wherein the first media format of the media is a performance-optimized format and the second media format of the media is a bandwidth-optimized format.

19. The system of claim 16, wherein the second media format is different from the first media format and the media in the second media format includes a plurality of video frames with at least one pre-requisite-based frame and with at least one frame that is prior to and required by the at least one pre-requisite-based frame for decoding.

20. The system of claim 16, wherein the second media format is different from the first media format and the media in the second media format includes a plurality of video frames with at least one post-requisite-based frame and with at least one frame that is subsequent to and required by the at least one post-requisite-based frame for decoding.

21. A system comprising:
one or more processors;
one or more storage media storing a set of instructions, which, when executed by the one or more processors, cause:
sending, to a client system, a first version of media in a first media format;

receiving, from the client system, a change request data for the first version of the media generated by the client system;

determining whether the change request data includes a request to modify the first version of the media to a second version of the media;

based at least in part on determining whether the change request data includes the request to modify at least a portion of the first version of the media by editing content of at least one image frame of a video stream of the media and, thereby, to generate the second version of the media, sending, to the client system, the media in a second media format different from the first media format.

22. The system of claim 21, wherein the set of instructions include instructions, which, when executed by the one or more processors, cause:

determining that the change request data includes the request to modify at least the portion of the first version of the media;

performing the request to modify at least the portion of the first version of the media thereby generating the second version of the media;

determining an amount of a change to the media from the first version of the media to the second version of the media;

based at least in part on the amount of the change to the media, determining to send the second version of the media to the client system in the second media format; and sending, to the client system, the second version of the media in the second media format.

23. The system of claim 21, wherein the first media format of the media is a bandwidth-optimized format and the second media format of the media is a performance-optimized format, or wherein the first media format of the media is a performance-optimized format and the second media format of the media is a bandwidth-optimized format.

24. The system of claim 21, wherein the second media format is different from the first media format and the media in the second media format includes a plurality of video frames with at least one pre-requisite-based frame and with at least one frame that is prior to and required by the at least one pre-requisite-based frame for decoding.

25. The system of claim 21, wherein the second media format is different from the first media format and the media in the second media format includes a plurality of video frames with at least one post-requisite-based frame and with at least one frame that is subsequent to and required by the at least one post-requisite-based frame for decoding.

* * * * *